United States Patent
Walther

(10) Patent No.: US 6,198,192 B1
(45) Date of Patent: Mar. 6, 2001

(54) BRUSH-HOLDING DEVICE

(75) Inventor: Bernd Walther, Bietigheim-Bissingen (DE)

(73) Assignee: ITT Manufacturing Enterprises, Inc.

( * ) Notice: Subject to any disclaimer, the term of this patent is extended or adjusted under 35 U.S.C. 154(b) by 0 days.

(21) Appl. No.: 09/367,414

(22) PCT Filed: Feb. 10, 1998

(86) PCT No.: PCT/EP98/00737

§ 371 Date: Aug. 12, 1999

§ 102(e) Date: Aug. 12, 1999

(87) PCT Pub. No.: WO98/36484

PCT Pub. Date: Aug. 20, 1998

(30) Foreign Application Priority Data

Feb. 15, 1997 (DE) ............................................. 197 06 833

(51) Int. Cl.[7] .................................................... H02K 5/14
(52) U.S. Cl. .................. 310/239; 310/238; 310/67 R; 310/68 R; 310/71
(58) Field of Search ............................. 310/239, DIG. 6, 310/240, 241, 245, 242, 248, 238, 68 C, 68 R, 67 R, 71

(56) References Cited

U.S. PATENT DOCUMENTS

| | | | |
|---|---|---|---|
| 3,527,971 | * | 9/1970 | Means .................................. 310/239 |
| 4,613,781 | * | 9/1986 | Sanders ................................ 310/239 |
| 4,845,396 | * | 7/1989 | Huber .................................. 310/239 |
| 4,926,075 | * | 5/1990 | Fushiya et al. ........................ 310/50 |
| 5,563,467 | * | 10/1996 | Csermak et al. ...................... 310/239 |
| 5,689,148 | * | 11/1997 | Rubinchik ............................ 310/239 |
| 5,821,663 | * | 10/1998 | Kiehnle et al. ...................... 310/249 |
| 5,942,819 | * | 8/1999 | Burgess et al. ........................ 310/51 |

FOREIGN PATENT DOCUMENTS

| | | | |
|---|---|---|---|
| 34 23 811 | 1/1985 | (DE) | ............................... H02K/5/14 |
| 4232692 | * 11/1988 | (DE) | ............................... H01R/39/38 |
| 89 13 753 | 11/1989 | (DE) | ............................... H02K/11/00 |
| 2 037 993 | 5/1991 | (DE) | . |
| 90 06 935 | 10/1991 | (DE) | ............................... G01P/3/487 |
| 291765 | * 11/1988 | (EP) | ............................... H02R/39/38 |
| 0 489 940 | 6/1992 | (EP) | ............................... H02K/5/14 |
| 07 67 525 | 4/1996 | (EP) | ............................... H02K/5/14 |
| 1 576 799 | 1/1969 | (FR) | ............................... H02K/11/00 |
| 2 605 154 | 4/1988 | (FR) | ............................... H02K/5/22 |
| 2 248 348 | 4/1992 | (GB) | ............................... H02K/11/00 |

* cited by examiner

*Primary Examiner*—Burton Mullins
(74) *Attorney, Agent, or Firm*—J. Gordon Lewis

(57) ABSTRACT

The invention relates to a brush-holding device for electric motors comprising carbon brushes, a conductive stamped grid as a printed circuit board, a base to which the printed circuit board is attached and components for monitoring temperature or for radioshielding. The printed circuit board is a single part and has several levels, at least one of which is staggered axially and in alignment with the commutator. The brush-holding device has a small overall length and the electric bonding of the components can take place simply without any additional parts.

3 Claims, 1 Drawing Sheet

BRUSH-HOLDING DEVICE

BACKGROUND OF THE INVENTION

The invention pertains to a brush-holding device with components for electrical connection, for temperature monitoring, and noise suppression of electromotors.

A brush-holding device of this kind is known, for example, from EP 489 940 A1. A disadvantage of this retaining device is its large space requirement in the axial and radial directions. The axial space requirement is caused, in particular, by a separate conductive plate for the electrical components, which is positioned at a distance from the first conductive plate in a second plane, and is supplied with current from a separate contact element. The contact element likewise extends primarily in the axial direction. The total required installation length of the brush-holding device and the assembly of the separate contact element are disadvantages.

SUMMARY OF THE INVENTION

The purpose of the present invention is to create a particularly compact brush-holding device in which making electrical contact to the electrical components is simple, and can be implemented without separate contact elements or wiring.

This problem is solved in that the conductive plate is a single piece and one of its planes is aligned with, and axially offset from, the commutator. With these features, on the one hand, a separate contacting of the offset plane is unnecessary, and on the other hand, the available space is optimally utilized.

BRIEF DESCRIPTION OF THE DRAWINGS

The invention will be explained in greater detail below based on one design example which is illustrated in the figures wherein.

DESCRIPTION OF THE PREFERRED EMBODIMENT

Figure 1:
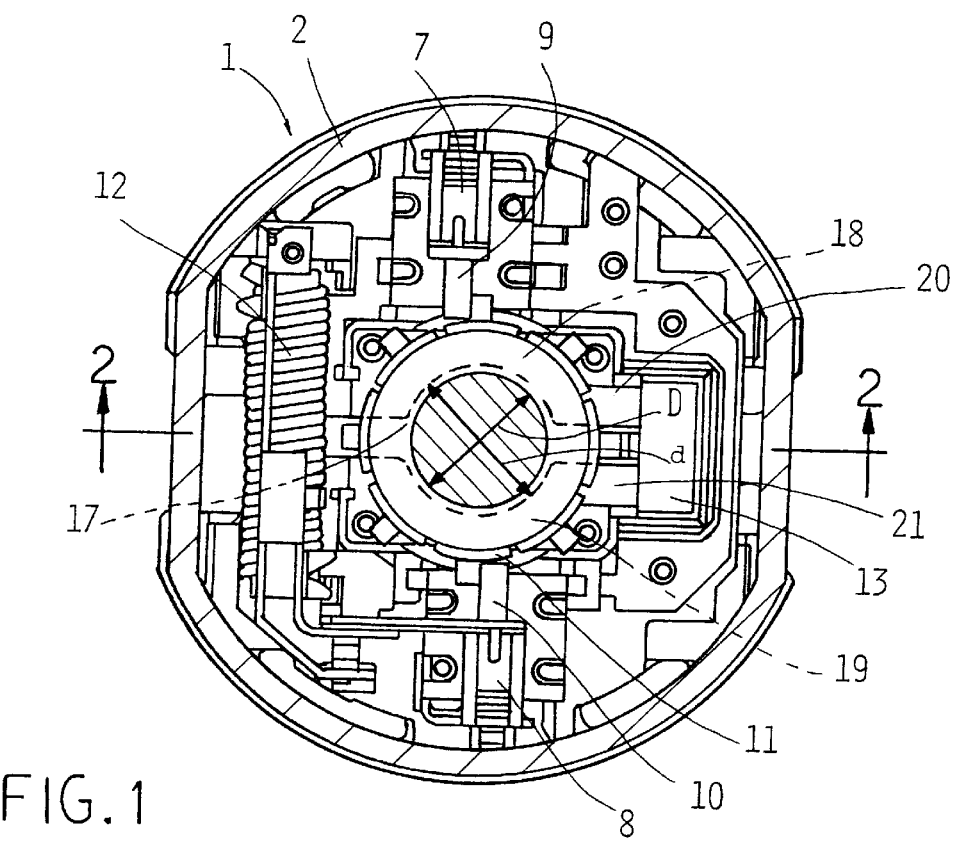
FIG. 1 is a top plan view of a brush-holding device with commutator illustrated with a cut-away motor housing and a cut-away motor shaft.

The brush-holding device 1 is surrounded radially by a motor housing 2 shown in cut-away format, and features essentially one base element 3 to which a single-piece, electrically conductive plate 4 is attached in the form of a stamped grid. Recesses 5 in the conductive plate, and pins 6 extending through to the base element 3, for example, are used for attachment. The conductive plate 4 is a single piece and is produced from sheet metal by stamping and bending operations and has, in the axial direction, several planes which rest, at least in part, against the base element 3. Furthermore, carbon brushes 9, 10 are introduced into cartridge-type brush holders 7, 8, which are located essentially opposite each other. Each of the carbon brushes 9, 10 transmits a spring force to the commutator 11. In this regard, the conductive plate 4 is used to carry current to the carbon brushes 9, 10 or to noise suppression elements, such as a coil 12, or a thermoswitch 13 for temperature monitoring of the electromotor. It is important that the components for temperature monitoring or for noise suppression be connected electrically to the conductive plate 4 or to the carbon brushes 9, 10, according to the specified circuit plan, without separately mounted contact elements.

Figure 2:
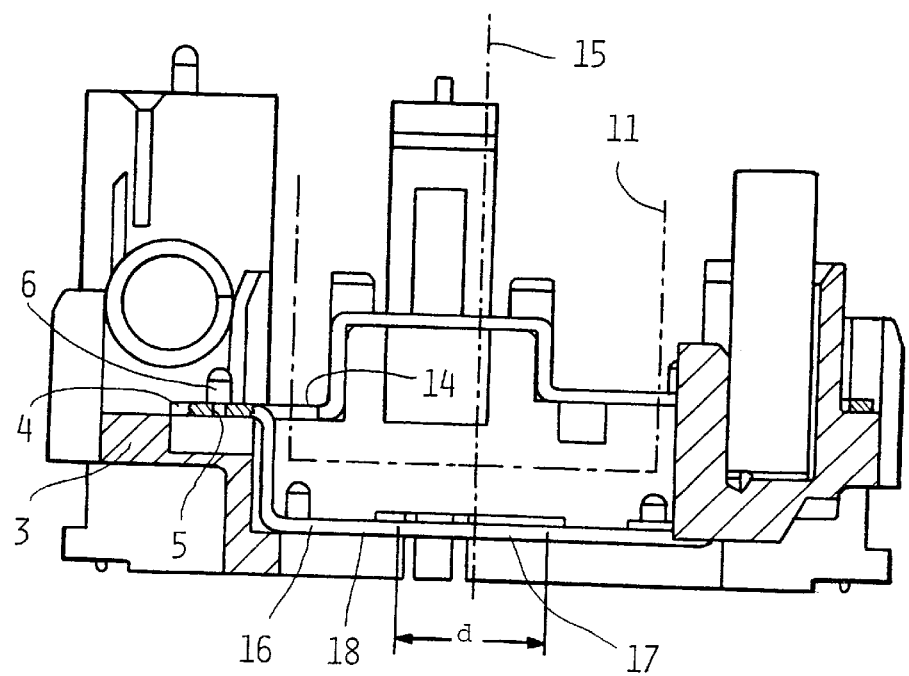
FIG. 2 is a cross section through the brush-holding device along line II—II in FIG. 1 with a schematically indicated commutator.

As FIG. 2 shows, the conductive plate 4 has a first plane 14 and a second plane 16, axially offset in the direction of the motor axis 15. The second plane 16 is aligned with the indicated commutator 11 and is axially offset from it, and extends over the commutator 11, with two legs 18, 19 at one end. Thus, on the one hand, the space beneath the commutator is used for the flat conductive plate, and, on the other hand, the sheet metal of the conductive plate 4 is used in this area as a contact element.

For passage of the shaft, the legs 18, 19 have an opening 17, whose diameter d corresponds essentially to the motor shaft diameter D. Each of the legs 18, 19 is electrically connected to one contact lug 20, 21 of the thermoswitch 13. The contact can be made, for example, by soldering or welding. As FIG. 2 shows, the thermoswitch is seated in a pocket of the base element 3, which is located axially at the same height as the commutator 11. The contact lugs 20, 21 are bent radially inward in the direction of the legs 18, 19, and after insertion of the thermoswitch, rest upon and overlap the lugs. In general, other electrical components can be connected to the conductive plate 4 in the same way.

What is claimed is:

1. A brush-holding device for electromotors with at least two carbon brushes which feed a commutator, an electrically insulating base element, and an electrically conductive plate in the form of a grid which is mounted to the base element and which connects the carbon brushes to electrical terminals and components for at least one of temperature monitoring and noise suppression, and having at least two planes axially offset to the electromotor axis, characterized in that the conductive plate is a single piece, and that at least one of the planes is aligned with, and axially offset from, the commutator and has at least one leg which extends over the commutator at one end.

2. The brush-holding device according to claim 1, characterized in that the at least one leg has an opening for passage of a shaft, whose diameter d is smaller than that of the diameter of the commutator.

3. The brush-holding device according to claim 2, characterized in that the diameter d of the opening is greater than the diameter D of the shaft.

* * * * *